Figure 1:
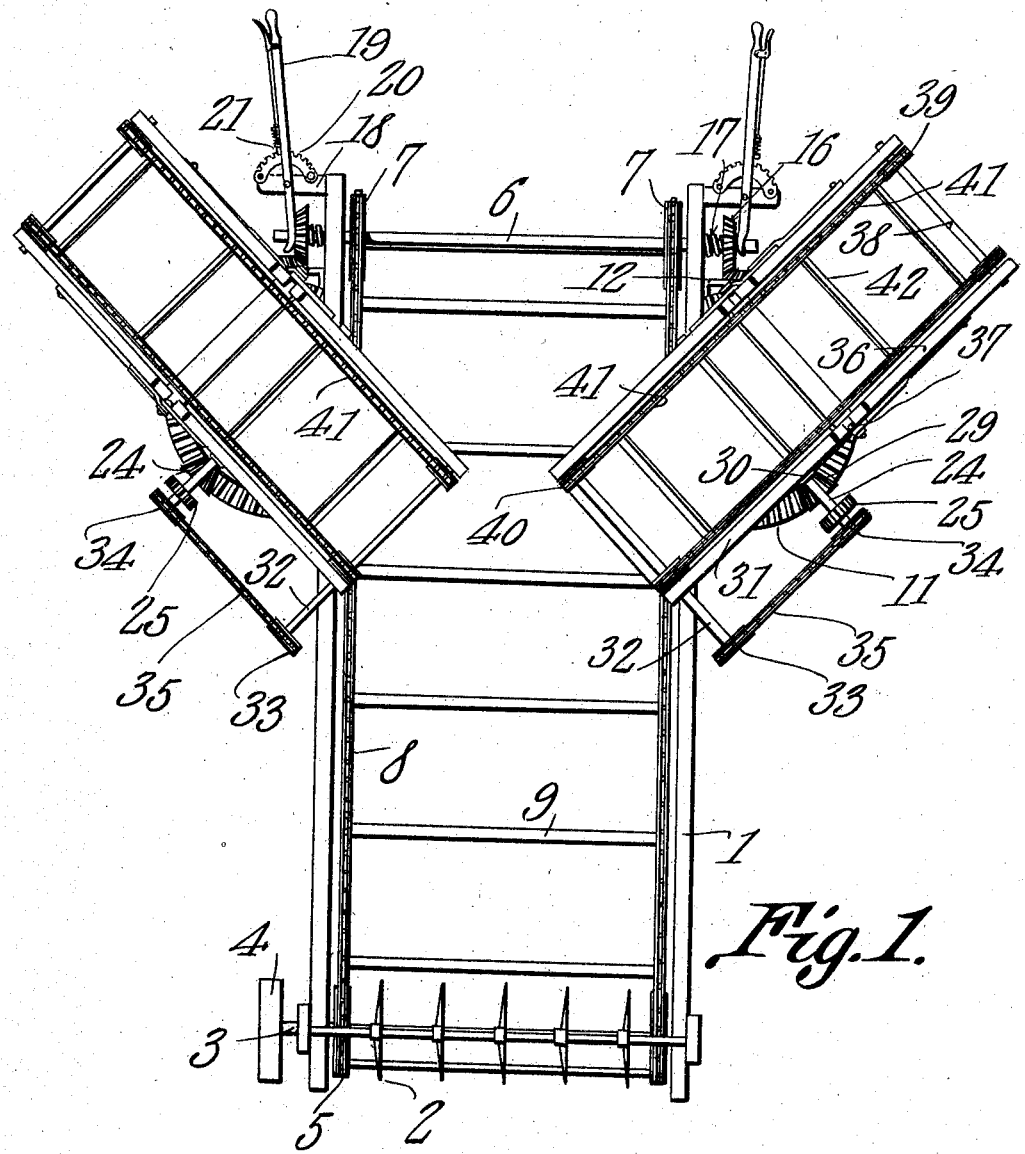

J. J. HESER.
THRESHER FEEDER.
APPLICATION FILED MAR 23, 1910.
981,085.
Patented Jan. 10, 1911.
3 SHEETS—SHEET 2.
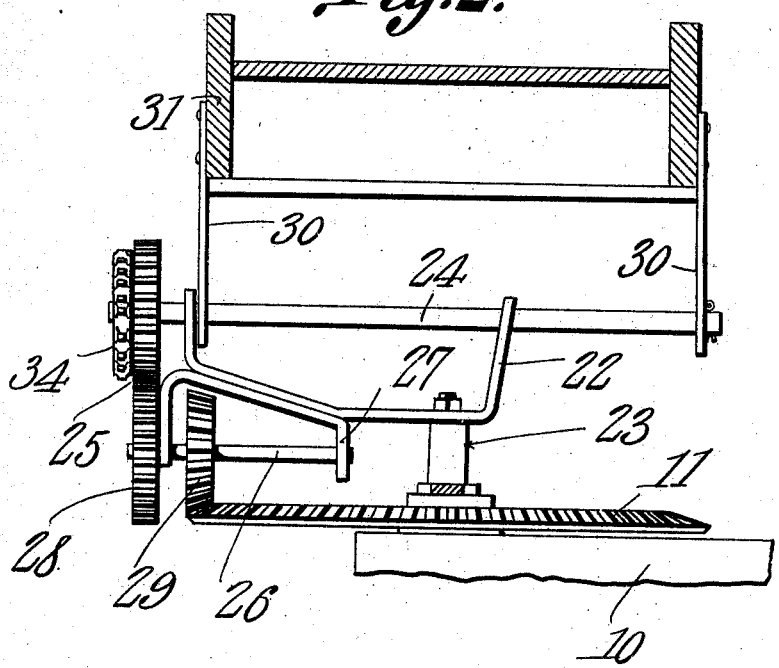
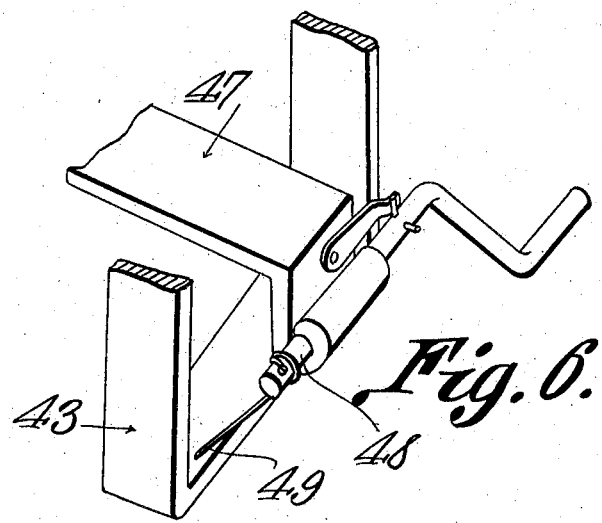
Witnesses
Inventor
John J. Heser.
By
Attorneys

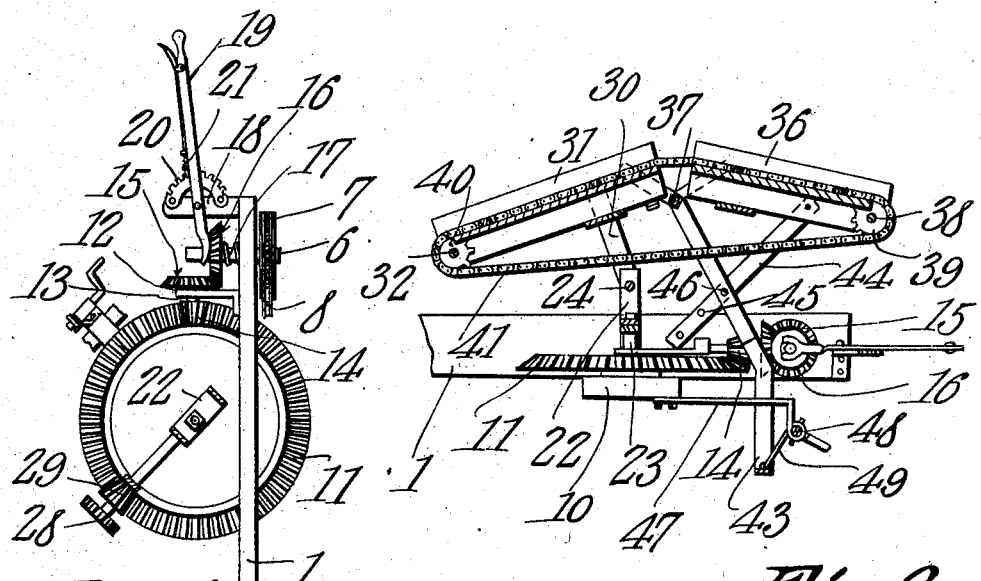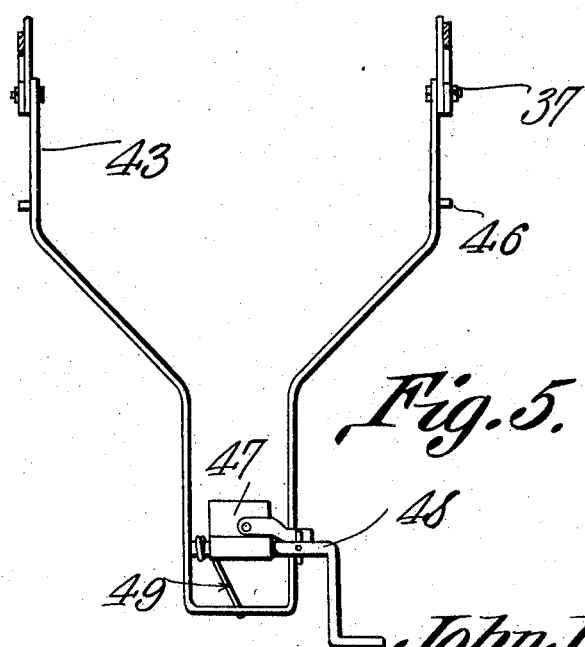

UNITED STATES PATENT OFFICE.

JOHN J. HESER, OF JACKSON, MINNESOTA.

THRESHER-FEEDER.

981,085.   Specification of Letters Patent.   Patented Jan. 10, 1911.

Application filed March 23, 1910. Serial No. 551,087.

*To all whom it may concern:*

Be it known that I, JOHN J. HESER, a citizen of the United States, residing at Jackson, in the county of Jackson and State of Minnesota, have invented a new and useful Thresher-Feeder, of which the following is a specification.

This invention relates to a thresher feeder and it consists in the novel construction and arrangement of its parts as hereinafter shown and described.

The object of the invention is to provide a feeder for a threshing machine which includes a main feeder trunk with a conveyer mounted for orbital movement along and supplemental feeder trunks having their delivery ends disposed toward the main feeder trunk, and means for operatively connecting one or both of the said supplemental feeder trunks with the operating mechanism of the conveyer of the main feeder trunk. The supplemental feeder trunks are so mounted that they may be adjusted at desired angles to the main feeder trunks and the supplemental feeder trunks are formed of sections hingedly connected together and means is provided for positioning the feeder trunk sections at the desired angles with relation to each other and with relation to a horizontal.

In the accompanying drawings,—Figure 1 is a top plan view of the thresher feeder. Fig. 2 is a transverse sectional view through one of the supplemental feeder trunks. Fig. 3 is a side elevation of a portion of the feeder. Fig. 4 is a top plan view of mechanism for transmitting movement from the movable part of the main feeder trunk to the movable part of one of the supplemental feeder trunks. Fig. 5 is an edge elevation of means employed for adjusting the angle of one of the sections of one of the supplemental feeder trunks with relation to a horizontal. Fig. 6 is a perspective view of a portion of a yoke forming a part of the feeder.

The thresher feeder includes a main feeder trunk 1 having band cutters 2 of any desired pattern mounted for operation at one end thereof. A shaft 3 is journaled for rotation at the delivery end of trunk 1 and is provided with a belt pulley 4 or other means whereby the said shaft may be rotated. Sprocket wheels 5 are fixed to the intermediate portions of the shaft 3 and a shaft 6 is journaled for rotation at the end of the trunk 1 opposite the end thereof at which the shaft 3 is journaled. Sprocket wheels 7 are fixed to the intermediate portions of the shaft 6 and sprocket chains 8 pass around the alined sprocket wheels 5 and 7. The chains 8 at the opposite sides of the trunk 1 are connected together by cross slats 9 and said chains and slats constitute an endless conveyer mounted for movement along the said trunk 1.

Brackets 10 are fixed to the end portion of the trunk 1 opposite the end thereof at which the shaft 3 is journaled and beveled gear wheels 11 are journaled for rotation upon the brackets 10. Brackets 12 are also fixed to the trunk 1 in the vicinity of the brackets 10 and stub shafts 13 are journaled for rotation in the brackets 12. Beveled pinions 14 are fixed to the ends of the shafts 13 and mesh with the beveled gear wheels 11. Beveled pinions 15 are fixed to the ends of the shaft 13 opposite the ends thereof which carry the beveled pinions 14. Beveled pinions 16 are slidably mounted upon the shaft 6 but are constrained to rotate with the same. Coiled springs 17 are interposed between the sides of the trunk 1 and the inner faces of the beveled pinion 16 and are under tension with a tendency to force the pinion 16 toward the pinion 15 and in mesh with the same. Brackets 18 are fixed to the trunk 1 in the vicinity of the bracket 12 and levers 19 are fulcrumed upon the brackets 18 and have working ends adapted to bear against the outer faces of the beveled pinion 16. Gear racks 20 are fixed to the brackets 18 and the levers 19 carry spring pawls 21 which are adapted to engage the teeth of the said rack 20. By this arrangement it will be observed that one or both of the levers 19 may be swung so as to carry either one or both of the beveled pinions 16 out of gear with the beveled pinion 15. Also it will be seen that when a lever 19 is swung so that the beveled pinion 16 may mesh with the beveled pinion 15 and while the shaft 6 is rotated that rotary movement is transmitted through the intermeshing pinions 15 and 16 and stub shaft 13 and pinions 14 to the beveled gear wheel 11.

As the supplemental feeding devices located at the opposite sides of the main feed trunk are identical in arrangement and structure a description of one will answer for both. The supplemental feeding device consists of a yoke 22 which is journaled upon the shaft 23 of one of the beveled gear wheels 11. The shaft 24 is journaled for rotation in the upper end portions of the yoke 22 and a gear wheel 25 is fixed to a projecting end portion of the said shaft 24. A shaft 26 is journaled for rotation in a bracket 27 which is carried by the yoke 22 and a gear wheel 28 is fixed to a projecting end portion of the shaft 26 and the said gear wheel 28 meshes with the gear wheel 25 above mentioned. A beveled pinion 29 is also fixed to the shaft 26 and meshes with the beveled gear wheel 11. Arms 30 are pivoted at their lower ends upon the shaft 28 and a throat section 31 is fixed between the upper portions of the said arms 30. A shaft 32 is journaled for rotation at the delivery end of the trunk section 31 and a sprocket wheel 33 is fixed to a projecting edge portion of the said shaft 32. A sprocket wheel 34 is fixed to a projecting end portion of the shaft 24 and a sprocket chain 35 passes around the sprocket wheels 33 and 34 and is adapted to transmit rotary movement from the shaft 24 to the shaft 32. Thus it will be seen that means is provided for transmitting rotary movement from the beveled gear wheel 11 to the shaft 32 located at the delivery end of the trunk section 31.

A trunk section 36 is hingedly connected at its delivery end to the receiving end of the trunk section 31 as at 37. A shaft 38 is journaled for rotation at the receiving end of the trunk section 36 and sprocket wheels 39 are fixed to the intermediate portion of the said shaft 38. Sprocket wheels 40 are fixed to the intermediate portion of the shaft 32 and sprocket chains 41 pass around the alined sprocket wheels 39 and 40 and the upper runs of the said chains traverse the combined length of the trunk sections 31 and 36. The chains 41 at the opposite sides of the said trunk sections are connected together by cross slats 42 and the said chains 40 and slats 42 constitute an endless conveyer mounted for movement along the said trunk sections in the manner indicated. A yoke 43 is pivotally connected at its ends with the trunk sections 31 and 36 at the point 37 which is the point at which the said trunk sections are hingedly connected together. Braces 44 are pivotally connected at their upper ends with the receiving end portions of the trunk section 36 and the said braces 44 are provided at their lower ends with perforations 45 whereby they may be adjustably connected with the sides of the yokes 43. The said yoke 43 is provided at its side with outstanding teeth 46 which are adapted to enter the perforations 45 of the braces 44 and adjustably hold the said braces in the manner as indicated. Therefore it will be seen that by adjusting the braces 44 along the sides of the yoke 43 that the trunk section 36 may be pitched and secured at any desired angle with relation to the trunk section 31.

Supplemental brackets 47 are fixed to the outer ends of the bracket 10 and a crank shaft 48 is journaled in bearings provided at the ends of the said supplemental brackets 47. A cable 49 is arranged to wind upon the intermediate portion of each of the crank shafts 48 and the lower ends of the cables 49 are attached to the intermediate portions of the respective yokes 43. Thus it will be seen that by winding the cables 49 upon the shaft 48 that the yokes 43 may be moved vertically and consequently the trunk section 31 may be rocked upon the shaft 24 as a pivot and thus the angle of disposition of the said trunk section 31 with relation to a horizontal may be adjusted. It is of course understood that as the trunk section 31 is rocked about the axis of the shaft 24 the trunk section 36 is also raised or lowered and its angular disposition with relation to a horizontal is adjusted. When it is desired to swing the trunk sections 31 and 30 with respect to each other upon the hinge joint 37 to any considerable extent, it will be necessary to increase or diminish the number of links in the chain 41.

From the above description it will be seen that when the chains 8 and slats 9 are moving along the trunk 1 and rotary movement is transmitted from the shaft 6 to the several gear wheels 11, that the chains 41 and slats 42 are moved in orbits about the supplemental trunks of which the sections 31 and 36 form component parts. Therefore, when the feeder as described is applied to a threshing machine bundles may be fed upon both of the supplemental conveyers and the said conveyers will carry the bundles to the main conveyer which will subject them to the action of the band cutters and deliver them to the threshing machine.

By providing the several adjustments parts may be so positioned that bundles may be easily and readily placed upon the supplemental feeder trunks whether the operatives while it works are compelled to stand upon the surface of the ground or upon the top of fully loaded wagon. By this arrangement the threshing machine may be adequately fed without requiring the operatives to work so close together as to interfere with each other.

Having described the invention what I claim as new and desire to secure by Letters Patent is:—

A thresher feeder comprising a main feeder trunk, a conveyer mounted for movement along the same, a shaft operated by said conveyer, a wheel journaled upon an approximately vertically disposed spindle and operated from said shaft, a supplemental trunk pivotally mounted upon the axis of said wheel and located at the side of the main feeder trunk, said supplemental feeder trunk consisting of sections hingedly connected together, a yoke pivotally connected with both of the sections of the supplemental feeder trunk, means for moving said yoke vertically with relation to the main feeder trunk to swing the sections of the supplemental feeder trunk vertically, means for adjusting the angular disposition of the sections of the supplemental feeder trunk with respect to each other, a conveyer mounted for movement along the supplemental feeder trunk, and means operatively connecting the conveyer mounted upon the supplemental feeder trunk with the said wheel.

In testimony that I claim the foregoing as my own, I have hereto affixed my signature in the presence of two witnesses.

JOHN J. HESER.

Witnesses:
ASHER O. NASBY,
GILES H. ANDERSON.